United States Patent
Montgomery

(10) Patent No.: US 8,578,107 B2
(45) Date of Patent: Nov. 5, 2013

(54) EXTENT MIGRATION SCHEDULING FOR MULTI-TIER STORAGE ARCHITECTURES

(75) Inventor: David Montgomery, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/706,421

(22) Filed: Feb. 16, 2010

(65) Prior Publication Data

US 2011/0202732 A1     Aug. 18, 2011

(51) Int. Cl.
*G06F 12/00* (2006.01)
*G06F 13/00* (2006.01)
*G06F 13/28* (2006.01)

(52) U.S. Cl.
USPC .......................................... 711/161; 711/162

(58) Field of Classification Search
None
See application file for complete search history.

(56) References Cited

U.S. PATENT DOCUMENTS

| | | | |
|---|---|---|---|
| 6,330,572 B1* | 12/2001 | Sitka ............................. | 707/608 |
| 6,430,611 B1 | 8/2002 | Kita et al. | |
| 2003/0217078 A1 | 11/2003 | Carlson et al. | |
| 2004/0177349 A1 | 9/2004 | Black-Ziegelbein et al. | |
| 2004/0205206 A1 | 10/2004 | Naik et al. | |
| 2005/0071560 A1 | 3/2005 | Bolik | |
| 2007/0083562 A1* | 4/2007 | DelGaudio et al. ........... | 707/200 |
| 2007/0106867 A1* | 5/2007 | Bonwick et al. .............. | 711/170 |
| 2007/0245101 A1 | 10/2007 | Taguchi et al. | |
| 2008/0168228 A1 | 7/2008 | Carr et al. | |
| 2008/0222218 A1* | 9/2008 | Richards et al. .............. | 707/204 |
| 2008/0282048 A1* | 11/2008 | Miura ........................... | 711/162 |
| 2008/0288948 A1* | 11/2008 | Attarde et al. ................ | 718/103 |
| 2008/0307178 A1 | 12/2008 | Agombar et al. | |
| 2009/0044035 A1 | 2/2009 | Taguchi et al. | |
| 2009/0055586 A1 | 2/2009 | Kawamura et al. | |
| 2009/0113435 A1 | 4/2009 | Mizrachi et al. | |
| 2009/0204759 A1 | 8/2009 | Seaman et al. | |
| 2009/0228535 A1 | 9/2009 | Rathi et al. | |
| 2009/0307283 A1 | 12/2009 | Lehr et al. | |
| 2010/0318756 A1* | 12/2010 | Yoshinari et al. ............. | 711/162 |

OTHER PUBLICATIONS

USPTO, Office Action, U.S. Appl. No. 12/132,949, Notification Date Sep. 15, 2010.
USPTO, Final Office Action, U.S. Appl. No. 12/132,949, Notification Date Jan. 21, 2011.
USPTO, Office Action, U.S. Appl. No. 12/132,949, Notification Date May 13, 2011.
USPTO, Final Office Action, U.S. Appl. No. 12/132,949, Notification Date Sep. 27, 2011.
USPTO, Office Action, U.S. Appl. No. 12/132,949, Notification Date Jan. 23, 2012.

* cited by examiner

*Primary Examiner* — Yaima Rigol
(74) *Attorney, Agent, or Firm* — Nelson and Nelson; Daniel P. Nelson; Alexis V. Nelson

(57) ABSTRACT

A method for scheduling the migration of extents between extent pools of a storage system is disclosed herein. In certain embodiments, such a method includes periodically profiling an extent pool to generate a historical data access profile of the extent pool. Using this historical data access profile, the method determines an optimal migration window for migrating an extent to the extent pool. The method then identifies an actual extent for migration to the extent pool. Once the actual extent is identified, the method schedules the extent for migration to the extent pool during the optimal migration window. A corresponding apparatus and computer program product are also disclosed herein.

24 Claims, 7 Drawing Sheets

EXTENT MIGRATION SCHEDULING FOR MULTI-TIER STORAGE ARCHITECTURES

BACKGROUND

1. Field of the Invention

This invention relates to data migration, and more particularly to apparatus and methods for scheduling data migration in multi-tier storage architectures.

2. Background of the Invention

Tiered storage, also known as hierarchical storage, is a storage architecture typically containing high-cost and lost-cost storage media logically arranged into tiers. This architecture may be used to efficiently utilize high-cost and lost-cost storage media to provide a desired level of cost and performance. For example, certain high-speed storage devices, such as solid state drives, are faster and more expensive than storage devices such as hard disk drives, which are in turn faster and more expensive than magnetic tape drives or optical drives. While it may be desirable to store all data on faster storage devices such as solid state drives, this can be impractical and prohibitively expensive. Instead, tiered storage enables slower and less expensive storage devices to store the bulk of an enterprise's data. This data may then be moved or copied to faster storage devices when needed. This may enable faster devices to act as cache for slower devices.

Current implementations for migrating extents (i.e., contiguous areas of data storage) within tiered storage architectures typically address why and where extents need to be migrated to improve performance. However, the decision when to migrate extents is either not addressed or not given the attention it deserves. The decision concerning when to migrate an extent has large implications on performance. For example, migrating extents when storage devices are processing large amounts of I/O can significantly reduce the storage devices' I/O performance. In certain cases, migrating extents at inopportune times can be self-defeating as the goal of the migration may be that of ultimately improving I/O performance.

In view of the foregoing, what are needed are apparatus and methods to more effectively address when to migrate extents between tiers in a multi-tier storage architecture. Ideally, such apparatus and methods will minimize I/O performance degradation on tiers that are either the source or destination for the migration.

SUMMARY

The invention has been developed in response to the present state of the art and, in particular, in response to the problems and needs in the art that have not yet been fully solved by currently available apparatus and methods. Accordingly, the invention has been developed to provide apparatus and methods for scheduling extent migration between tiers of a multi-tier storage architecture. The features and advantages of the invention will become more fully apparent from the following description and appended claims, or may be learned by practice of the invention as set forth hereinafter.

Consistent with the foregoing, a method for scheduling the migration of extents between extent pools of a storage system is disclosed herein. In certain embodiments, such a method includes periodically profiling an extent pool to generate a historical data access profile of the extent pool. Using this historical data access profile, the method determines an optimal migration window for migrating an extent to the extent pool. The method then identifies an actual extent for migration to the extent pool. Once the actual extent is identified, the method schedules the extent for migration to the extent pool during the optimal migration window.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
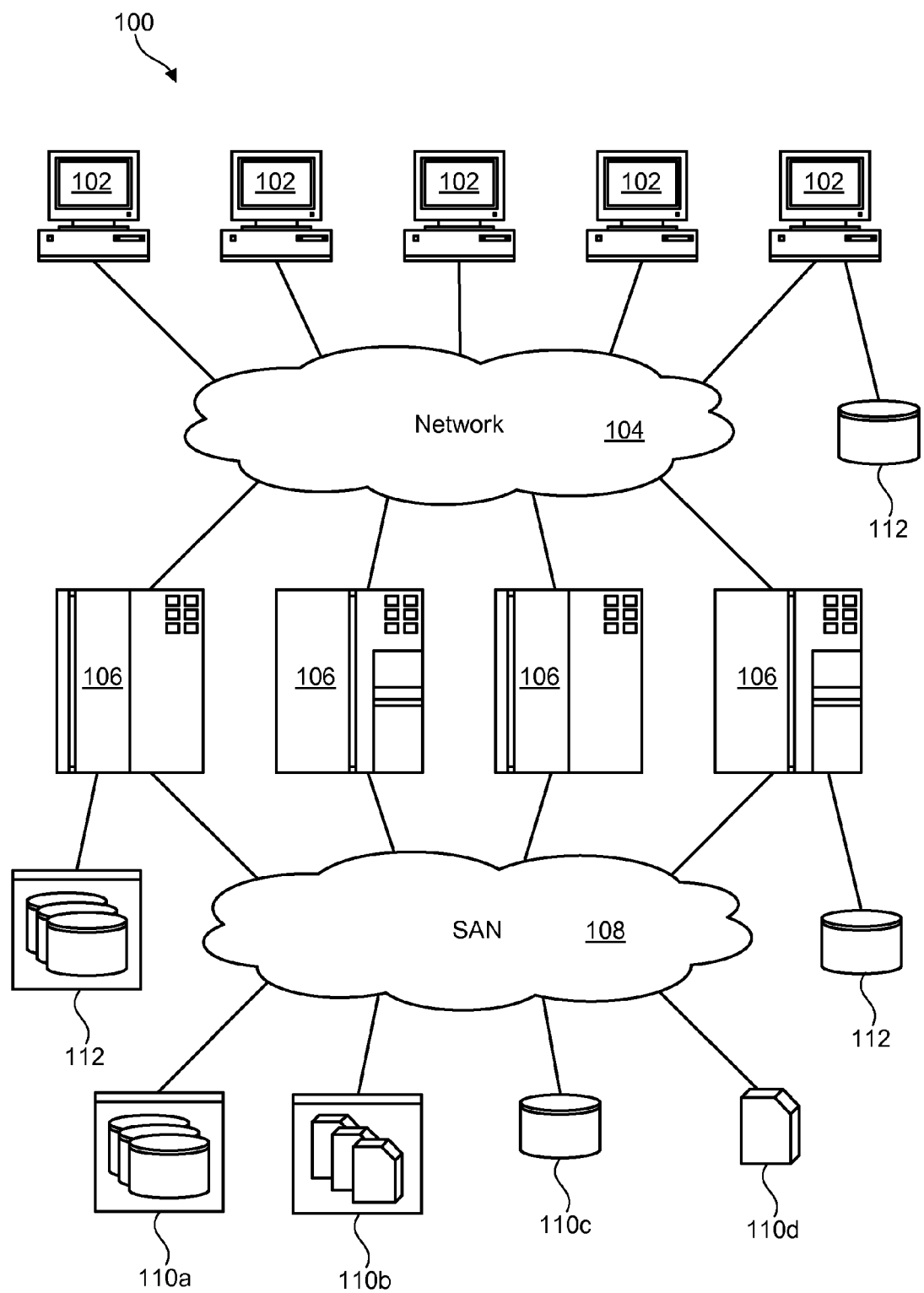
FIG. 1 is a high-level block diagram showing one example of a network architecture where various types of storage systems may reside.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented by way of example and not limitation. Indeed, the apparatus and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain tiered storage that may benefit from the apparatus and methods disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain tiered storage that may benefit from the apparatus and methods disclosed herein.

Figure 2:
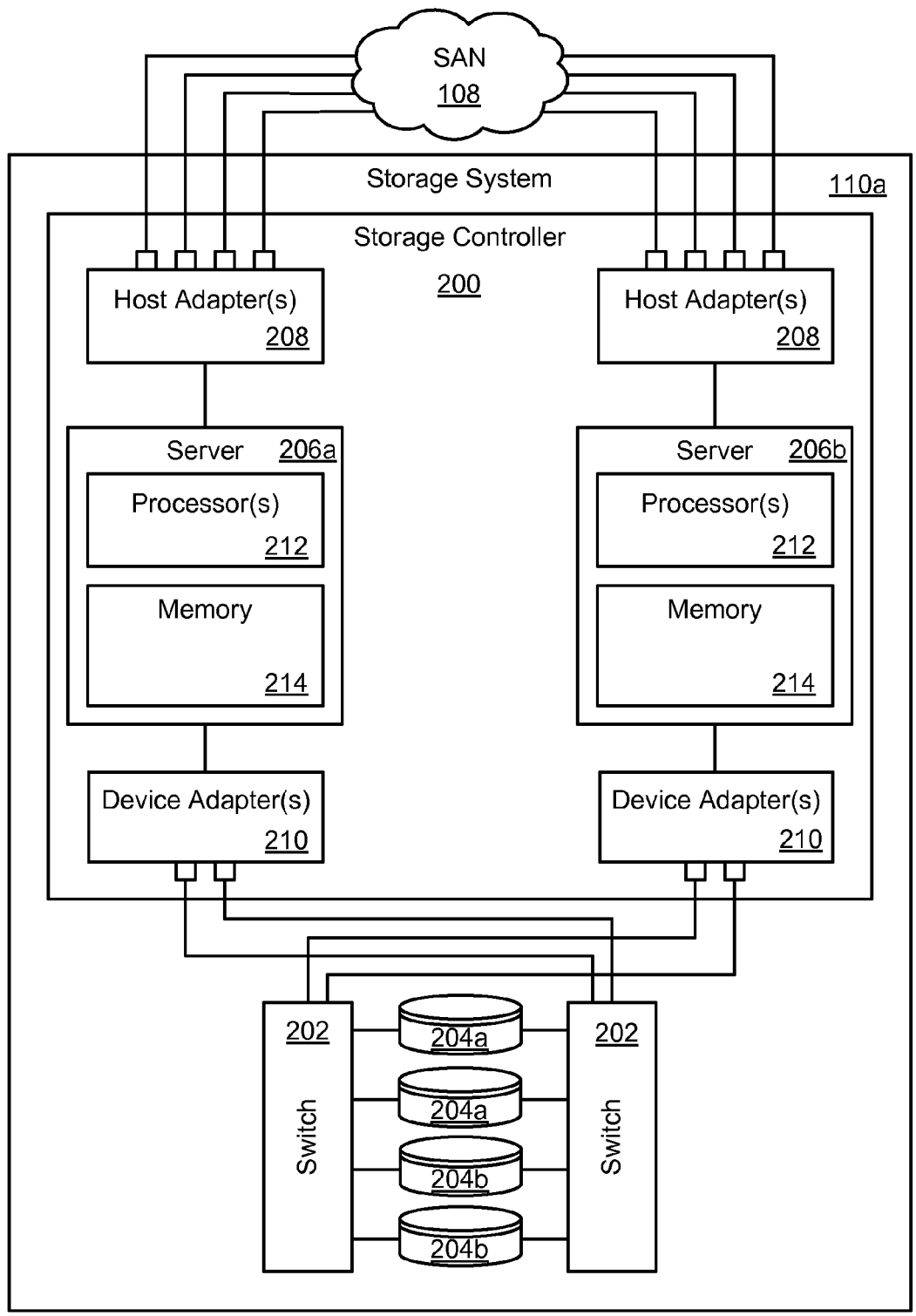
FIG. 2 is a high-level block diagram showing one example of a storage system where an apparatus and method in accordance with the invention may be implemented.

Referring to FIG. 2, one embodiment of a storage system 110a containing an array of storage devices 204 (e.g., hard-disk drives 204a and/or solid-state drives 204b) is illustrated. The internal components of the storage system 110a are shown since apparatus and methods in accordance with the invention may be implemented within such a storage system 110a although they are not limited to such a storage system 110a. As shown, the storage system 110a includes a storage controller 200, one or more switches 202, and one or more storage devices 204, such as hard-disk drives 204a or solid-state drives 204b (e.g., flash-memory-based drives 204b). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the apparatus and methods disclosed herein are not limited to the IBM DS8000™ enterprise storage system 110a, but may be implemented in any comparable or analogous storage system 110 regardless of the manufacturer, product name, or components or component names associated with the storage system 110. Any storage system 110 that could benefit from the apparatus and methods disclosed herein is deemed to fall within the scope of the invention. Thus, the IBM DS8000™ is presented only by way of example and is not intended to be limiting.

Figure 4:
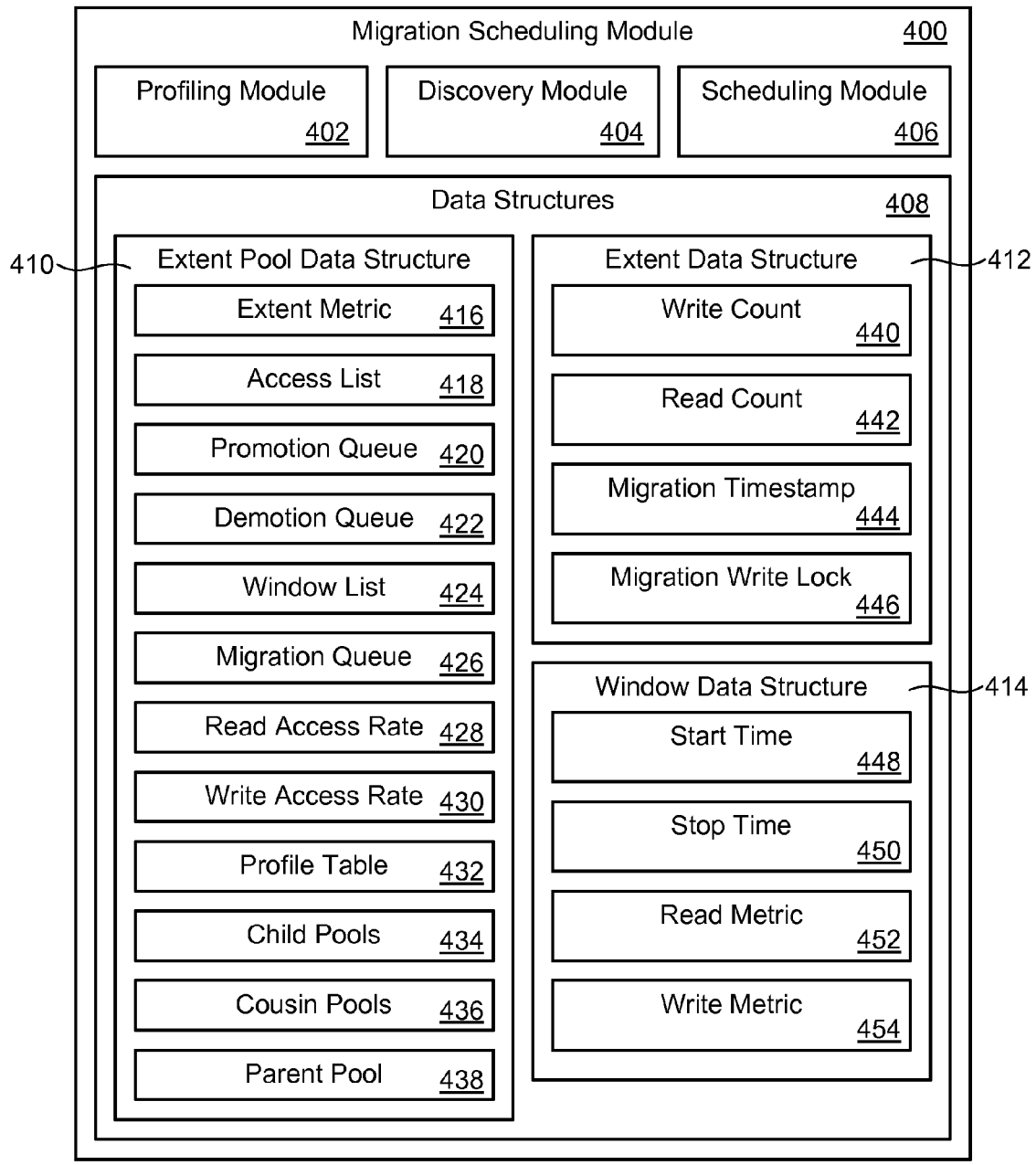
FIG. 4 is a high-level block diagram showing one embodiment of a migration module which may be implemented within a storage system.

In selected embodiments, each server 206 in the storage system 110a includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204. The volatile memory and non-volatile memory 214 may also store software modules (as shown in FIG. 4) for scheduling the migration of extents between extent pools of the storage system 110a. These modules will be described in more detail in association with FIG. 4.

Figure 3:
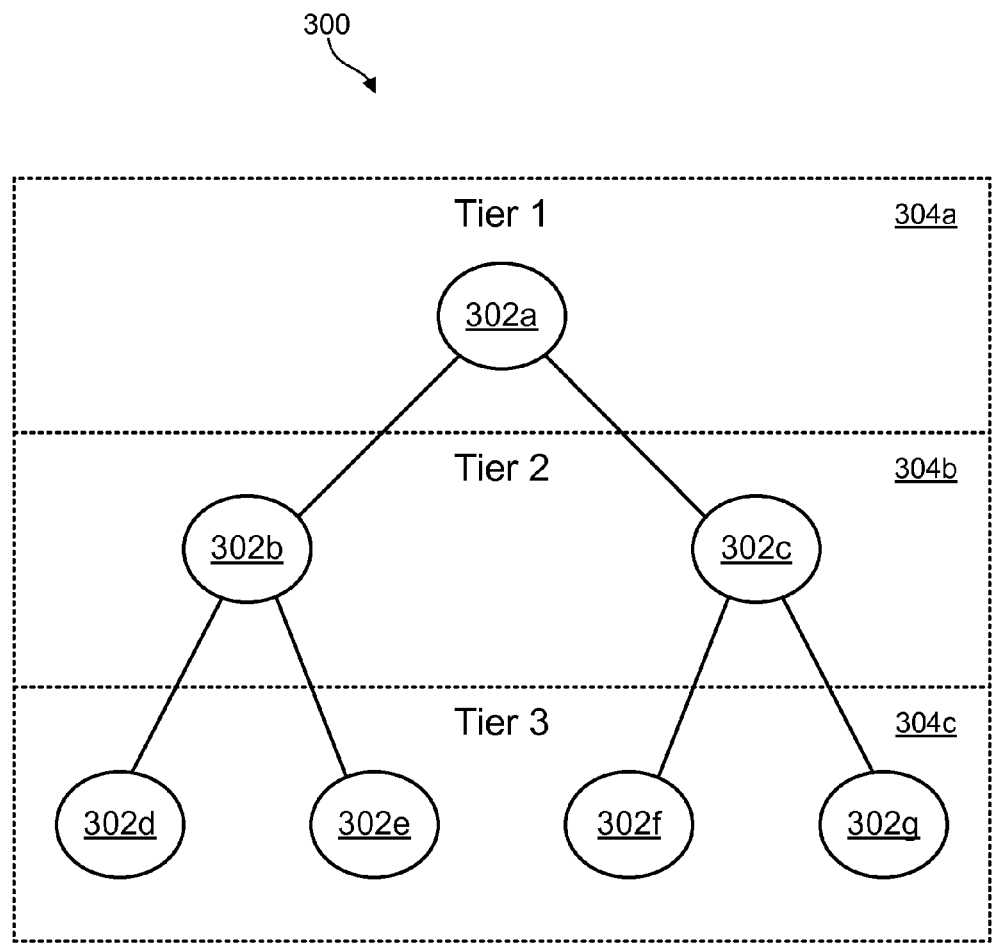
FIG. 3 is a high-level diagram of extent pools organized into a multi-tiered (i.e., hierarchical) storage architecture.

Referring to FIG. 3, one example of a multi-tiered (i.e., hierarchical) storage architecture 300 comprising multiple extent pools is illustrated. In certain embodiments, the storage architecture 300 is established in a single storage system 110, such as the storage system 110a illustrated in FIG. 2. In other embodiments, the storage architecture 300 is distributed across multiple storage systems 110. Each tier 304 of the storage architecture 300 may include storage devices 204 of differing performance and/or cost. For example, a first tier 304a may contain faster storage devices 204, such as RAM or RAM drives, a second tier 304b may contain slower and less expensive storage devices 204 such as solid state drives, and a third tier 304c may contain yet slower and less expensive storage devices such as hard disk drives. The tiered storage architecture 300 in FIG. 3 is provided only by way of example and is not intended to be limiting. In other embodiments, the tiered storage architecture 300 may include more or fewer tiers than illustrated, or different storage media types in each tier.

Each of the tiers 304 may contain one or more extent pools 302, each of which may contain one or more extents. For the purposes of this disclosure, the term "extent" is used to refer to a contiguous block of bits or bytes in an extent pool 302. In certain embodiments, the size of each extent in the tiered storage architecture is uniform. An extent pool 302 may be contained on a single storage device 204 or may span multiple storage devices 204 (such as when organized as a RAID).

The extent pools 302 described above may be arranged into a hierarchical relationship, as shown in FIG. 3. Thus, an extent pool 302 may include both parent and child extent pools 302. For example, the extent pool 302b includes a parent extent pool 302a and two child extent pools 302d, 302e. Extent pools 302 that are within the same tier 304 may be considered cousins. Thus, the extent pool 302c would be considered a cousin of extent pool 302b. Similarly, each of the extent pools 302d, 302e, 302f, and 302g would be considered cousins. In certain embodiments, the extent pools 302 are organized into RAID configurations, such as a RAID 5 or RAID 10 extent pool, although other configurations are also possible.

Referring to FIG. 4, in selected embodiments, an apparatus for scheduling the migration of extents between extent pools may be implemented in the form of one or more modules and accompanying data structures. These modules and data structures may be collectively referred to as a migration scheduling module 400. The migration scheduling module 400 may be implemented in hardware, software or firmware executable on hardware, or a combination thereof. The modules and accompanying data structures are presented only by way of example and are not intended to be limiting. Indeed, alternative embodiments may include more or fewer modules or data structures than those illustrated, or the modules or data structures may be organized differently. Furthermore, it should be recognized that, in some embodiments, the functionality of some modules may be broken into multiple modules or, conversely, the functionality of several modules may be combined into a single module or fewer modules.

As shown, the migration scheduling module 400 includes a profiling module 402, a discovery module 404, and a scheduling module 406. The profiling module 402 may be configured to periodically profile the extent pools 302 in the tiered storage architecture 300 to generate a historical data access profile for each extent pool 302. This will allow data access rates for a given extent pool to be determined at selected time intervals (every minute, five minutes, hour, etc.) within an overall time cycle (day, week, month, etc.). The time interval as well as the time cycle may be a design choice that is varied based on the application.

As will be explained in more detail hereafter, the historical data access profile will be used to determine periods of lower or minimal activity in order to calculate optimal migration windows for migrating extents. In selected embodiments, the historical data access profile is stored in a profile table 432. The profile table 432 may store running averages of read and write rates to an extent pool 302 at each time interval. To generate the historical data access profile in the profile table 432, the profiling module 402 may utilize the method 500 illustrated in FIG. 5 at every time interval "t".

A discovery module 404 is configured to determine migration windows for each extent pool 302 based on each extent pool's historical data access profile. The discovery module 404 may store (or list) these migration windows in a window list 424 associated with each extent pool. Once the migration windows for an extent pool 302 have been determined, the discovery module 404 may order the windows in the window list 424 from most optimal to least optimal. This will allow the most optimal migration window that is available to be selected when scheduling an extent for migration. To discover the migration windows and generate the window list 424, the discovery module 404 may utilize the method 600 illustrated in FIG. 6. This method 600 may be executed once each time cycle (i.e., after the historical data access profile for each extent pool 302 has been updated) or on an as-need basis.

Once the discovery module 404 has discovered the migration windows and generated the window list 424 for an extent pool 302, a scheduling module 406 schedules one or more extents for migration to the extent pool 302. To accomplish this, the scheduling module 406 references a migration queue 426 maintained for the extent pool 302. This migration queue 426 is a FIFO-prioritized queue that lists extents waiting to be migrated to the extent pool 302. This will cause an extent that has been waiting for migration the longest to be scheduled first and assigned the most optimal migration window. To schedule extents for migration, the scheduling module 406 implements the method 700 illustrated in FIG. 7. This method 700 is executed each time cycle (after the method 600 has been executed) or on an as-need basis.

To enable the functionality of the profiling module 402, the discovery module 404, and the scheduling module 406, various different data structures 408 may be generated and maintained for the storage architecture 300. These data structures 408 may include an extent pool data structure 410 for each extent pool 302 in the tiered storage architecture 300, an extent data structure 412 for each extent in the tiered storage architecture 300, and a window data structure 414 for each window that is generated by the discovery module 404 and referenced in the window list 424. Each of the data structures 410, 412, 414 contains multiple fields, each of which will be explained in more detail hereafter.

In selected embodiments, an extent pool data structure 410 includes an extent metric 416 that defines a set of units or a threshold value that determines when an extent should be promoted (e.g., moved from the extent pool to a parent extent pool) or demoted (moved from the extent pool to a child extent pool) to or from the extent pool. This metric 416 could be virtually anything, such as a number of read or write hits, a number of read or write hits per time period, the ratio of read to write hits, or the amount of time that has passed since an extent was last accessed (read from or written to). This metric 416 may indicate how "hot" or "cold" an extent needs to be before it is promoted or demoted, and may be used in a rule to determine whether the extent should be promoted or demoted from the extent pool.

An access list 418 lists the extents that currently reside in the extent pool associated with the extent pool data structure 410. Thus, when an extent is added to or deleted from the extent pool, a reference associated with the extent may be added to or deleted from the access list 418. A promotion queue 420 lists extents that have previously been promoted from the extent pool 302 to another extent pool 302. Similarly, a demotion queue 422 lists extents that have previously been demoted from the extent pool 302 to another extent pool 302. These queues 420, 422 may be helpful in cases where extents that were previously promoted or demoted from the extent pool 302 are identified to be moved back into the extent pool 302. If the extents have not been modified and they are still present in the extent pool, they may be moved back into the extent pool by simple pointer association (without physically moving any data). Such extents may not be scheduled for migration (by the scheduling module 406) since they may be migrated in constant time by pointer association.

As previously mentioned, the window list 424 lists migration windows for migrating extents to the extent pool 302. In certain embodiments, the migration windows in the window list 424 are ordered from most optimal to least optimal. The extent pool data structure 410 also contains a migration queue 426 that lists, on a FIFO-prioritized basis, extents that are waiting to be migrated to the extent pool 302. This allows extents that have been waiting the longest to be scheduled first. Each extent listed in the migration queue 426 may have a tag reflecting the source extent pool 302 in which the extent resides.

The extent pool data structure 410 may also store a read access rate 428 and a write access rate 430. These may be hard-coded values that define, under optimal conditions, the maximum read rate and write rate that the extent pool will support. These values 428, 430 may be used to determine the amount of time that will be needed to move an extent to the extent pool 302.

As mentioned previously, the extent pool data structure 410 includes a profile table 432 to store a historical data access profile for the extent pool 302. More specifically, the profile table 432 may store running averages of read and write rates to the extent pool 302 at each time interval "t". The data in this profile table 432 is used to calculate the migration windows, as will be explained in more detail hereafter.

The extent pool data structure 410 may also store information regarding the extents pools that are related to the extent pool associated with extent pool data structure 410. For example, the extent pool data structure 410 may store information about the extent pool's children 434, cousins 436, and parents 438. This information may be helpful to know which extent pools a particular extent pool can promote or demote extents, or from which extent pools a particular extent pool can receive extents.

As previously mentioned, an extent data structure 412 may be generated and maintained for each extent in the storage architecture 300. This extent data structure 412 may include a write count 440 and a read count 442. The write count 440 indicates how many times the extent has been written to, and the read count 442 indicates how many times the extent has been read from. The write count 440 and read count 442 may be used to determine how hot or cold the extent is and whether it should be migrated to an extent pool in another storage tier. In selected embodiments, the extent data structure 412 may also include a migration time stamp 444 and a migration write lock 446. The migration time stamp 444 records the last time the extent was migrated. The migration write lock 446, on the other hand, identifies whether the extent has been modified since it was last migrated. If an extent has not been modified since its last migration, in certain cases it may be moved to another extent pool by simple pointer association (assuming that the extent previously resided in and still exists in the extent pool).

A window data structure 414 may be created for each migration window that is generated by the discovery module 404 and referenced in the window list 424. In selected embodiments, the window data structure 414 includes a start time 448 and a stop time 450 indicating when the window starts and stops, respectively. The start and stop times for the window may be calculated using the method 600 illustrated in FIG. 6. The length of the window (i.e., the duration between the start and stop times 448, 450) may be determined by calculating the amount of time it would take to migrate an extent to the extent pool associated with the window. In certain embodiments, this duration may be calculated using a read metric 452 and/or write metric 454. These metrics 452, 454 may be ratios between zero and one and may be used to calculate an approximate time for migrating an extent within the window as well as ordering the windows in the window list 424 from most optimal to least optimal. In certain embodiments, these metrics 452, 454 are calculated using the read access rate 428 and write access rate 428 for the extent pool and the historical data access profile in the profile table 432.

Figure 5:
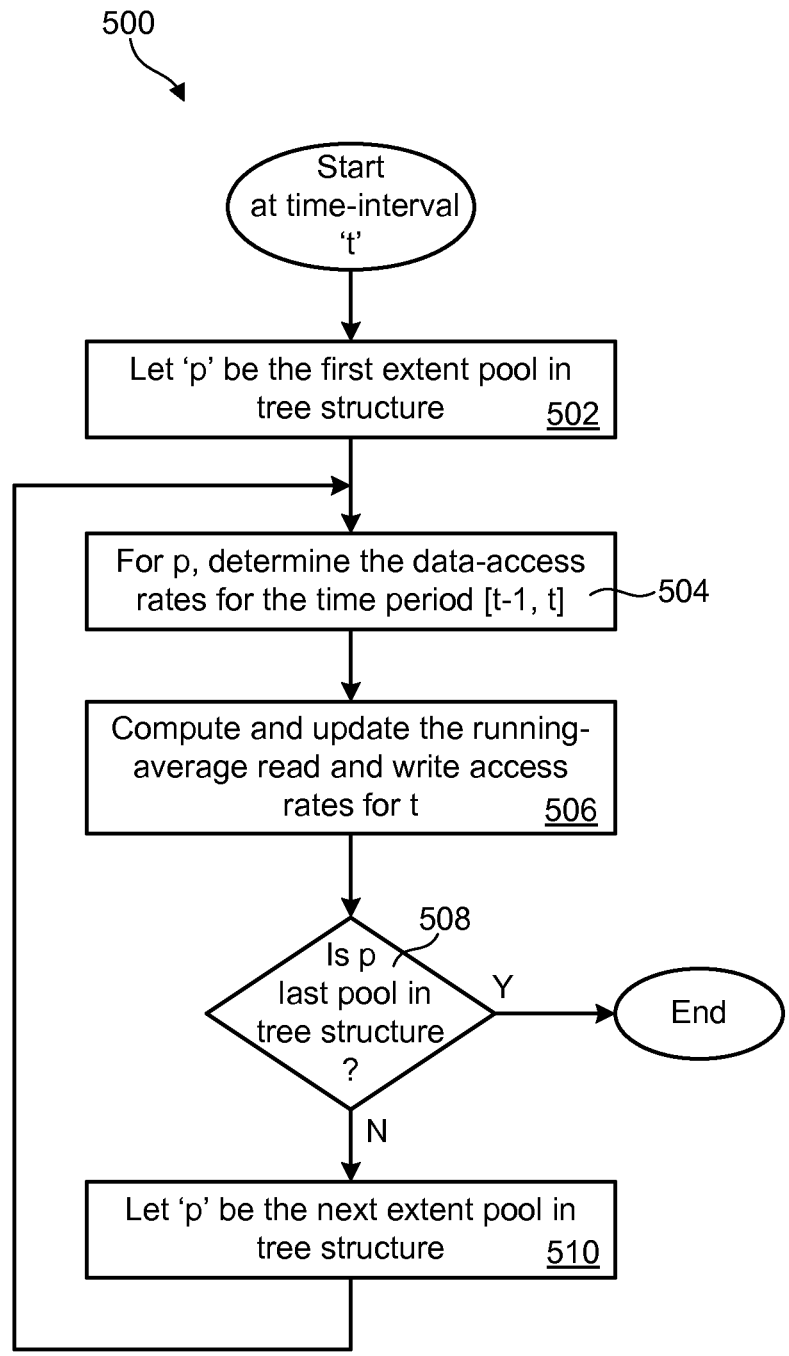
FIG. 5 is a flow diagram showing one embodiment of a method for profiling extent pools in a hierarchical tree structure at selected time intervals.

Referring to FIG. 5, one embodiment of a method 500 for profiling the extent pools 302 in a hierarchical tree structure 300 at a selected time interval "t" is illustrated. As shown, the method 500 initially lets 502 "p" be the first extent pool 302 in the hierarchical tree structure 300. The method 500 then determines 504 the data access rates for the extent pool "p" over the time period [t−1, t]. This step 504 essentially determines the data access rates (including the read and/or write access rates) for the extent pool "p" since the method 500 was last executed. The method 500 then computes and updates the running averages for the read and write access rates for the time interval "t". These running averages may be stored in the profile table 432, as previously discussed. Thus, if the time cycle is one day, and the time interval "t" is every five minutes during the day, the method 500 will calculate the read and write access rates for each five-minute time interval "t" and average these access rates with the read and write access rates measured on previous days. In this way, the profile table 432 will store running averages of the read and write access rates for each five minute interval over multiple days. The time cycle and time interval "t" may be varied as needed.

Once the running averages have been computed 506 and updated for the extent pool "p", the method 500 determines 508 whether the extent pool "p" is the last extent pool 302 in the tree structure 300. If so, the method 500 ends. If not so, the method lets 510 "p" be the next extent pool 302 in the tree structure 300. The method 500 then determines 504 the data-access rates and updates 506 the running averages for the next extent pool "p". This may be performed until the last extent pool "p" in the tree structure 300 is processed, thereby allowing the method 500 to walk the tree structure 300.

Figure 6:
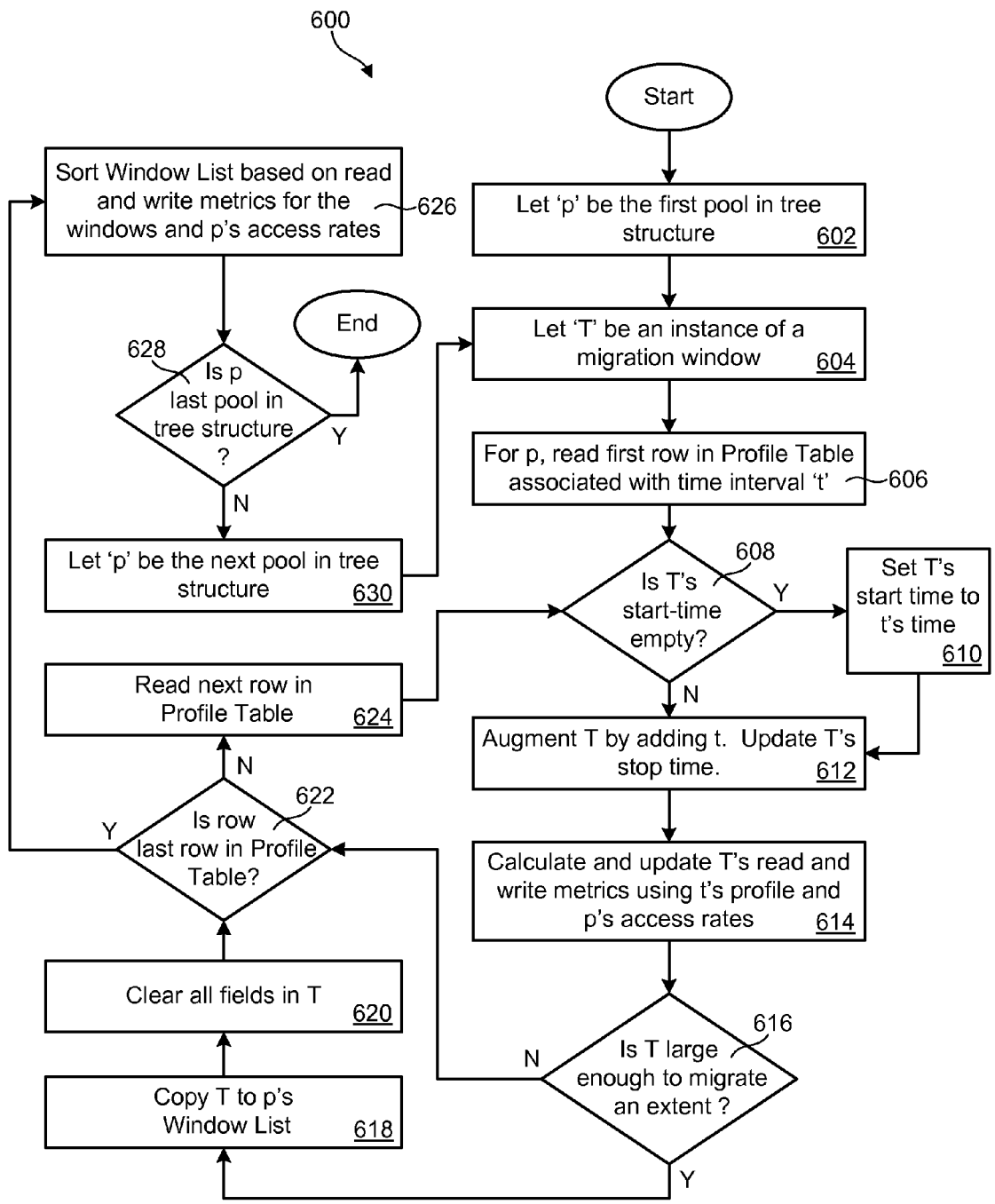
FIG. 6 is a flow diagram showing one embodiment of a method for discovering migration windows for migrating extents between extent pools in the hierarchical tree structure.

Referring to FIG. 6, one embodiment of a method 600 for discovering migration windows for each extent pool 302 in a hierarchical tree structure 300 is illustrated. This method 600 may be executed when the time cycle completes (i.e., when the profile table 432 has been completely updated for each extent pool 302 in the tree structure 300) or on an as-need basis. As shown, the method 600 initially lets "p" be the first extent pool 302 in the hierarchical tree structure 300. The method then lets 604 "T" be an instance of a time window (i.e., lets 604 "T" be an instance of a window data structure 414).

For the extent pool "p", the method 600 reads 606 the first row (associated with the time interval "t") in the profile table 432. The method 600 then determines 608 whether the start time 448 in the window data structure "T" is empty. If it is empty, the method 600 sets 610 the start time of "T" to the time associated with the time interval "t" (i.e., the time the read and write access measurements were taken). Once the start time is populated, the method 600 augments 612 the time window "T" by adding "t". Thus, if the time interval "t" is every five minutes, as in the example above, the method 600 will augment the time window "T" by five minutes and update the window's stop time 450 accordingly. The method 600 then calculates 614 and updates 614 the read and write metrics 452, 454 for "T" using the profile for "t" and the access rates for the extent pool "p". Using the read and write metrics 452, 454 calculated in step 614, the method 600 determines 616 whether the duration of "T" (i.e., the duration between the start time 448 and stop time 450) provides enough time to migrate an extent to the extent pool "p". If not, the method 600 reads 624 the next row in the profile table 432 and repeats steps 612, 614. The steps 624, 612, 614 will be repeated until the duration of "T" is long enough to migrate an extent to the extent pool "p" or until the last row in the profile table 432 is reached.

Once the duration of "T" is extended sufficiently, the method 600 copies 618 "T" to the window list 424 for "p" and clears 620 all fields in "T". The method 600 then determines 622 whether the end of the profile table 432 has been reached. If not, the method 600 builds a new window "T" and adds this window to the window list 424 for "p". The method 600 continues this process (populating the window list 424 with windows "T") until the method 600 reaches the last row in the profile table 432. Once the method 600 reaches the last row in the profile table 432, the window list 424 is full. The method 600 then sorts 626 the windows in the window list 424 based on the read and write metrics 452, 454 and the access rates for "p". In essence, this sorts 626 the window list 424 from the most optimal migration window to the least optimal migration window. The most optimal migration window will typically be the shortest migration window scheduled at or near the time the I/O to the extent pool is at its lowest. Similarly, the least optimal migration window will typically be the longest migration window scheduled at or near the time the I/O to the extent pool is at its highest. In selected embodiments, the duration of the sum all windows in the window list 424 will have a deterministic size approximate to the amount of time it would take to fully populate the extent pool, given the performance of the extent pool 302.

Once the windows in the window list 424 are sorted 626, the method 600 determines 628 whether "p" is the last extent pool in the tree structure 300. If not, the method lets 630 "p" be the next extent pool 302 in the tree structure 300 and repeats the previously mentioned steps for the next extent pool 302. In other words, the method 600 populates the window list 424 of the next extent pool "p" with windows and sorts the window list 424 for the extent pool. Once the method 600 populates and sorts the window list 424 for all extent pools 302 in the tree structure 300, the method 600 ends.

Figure 7:
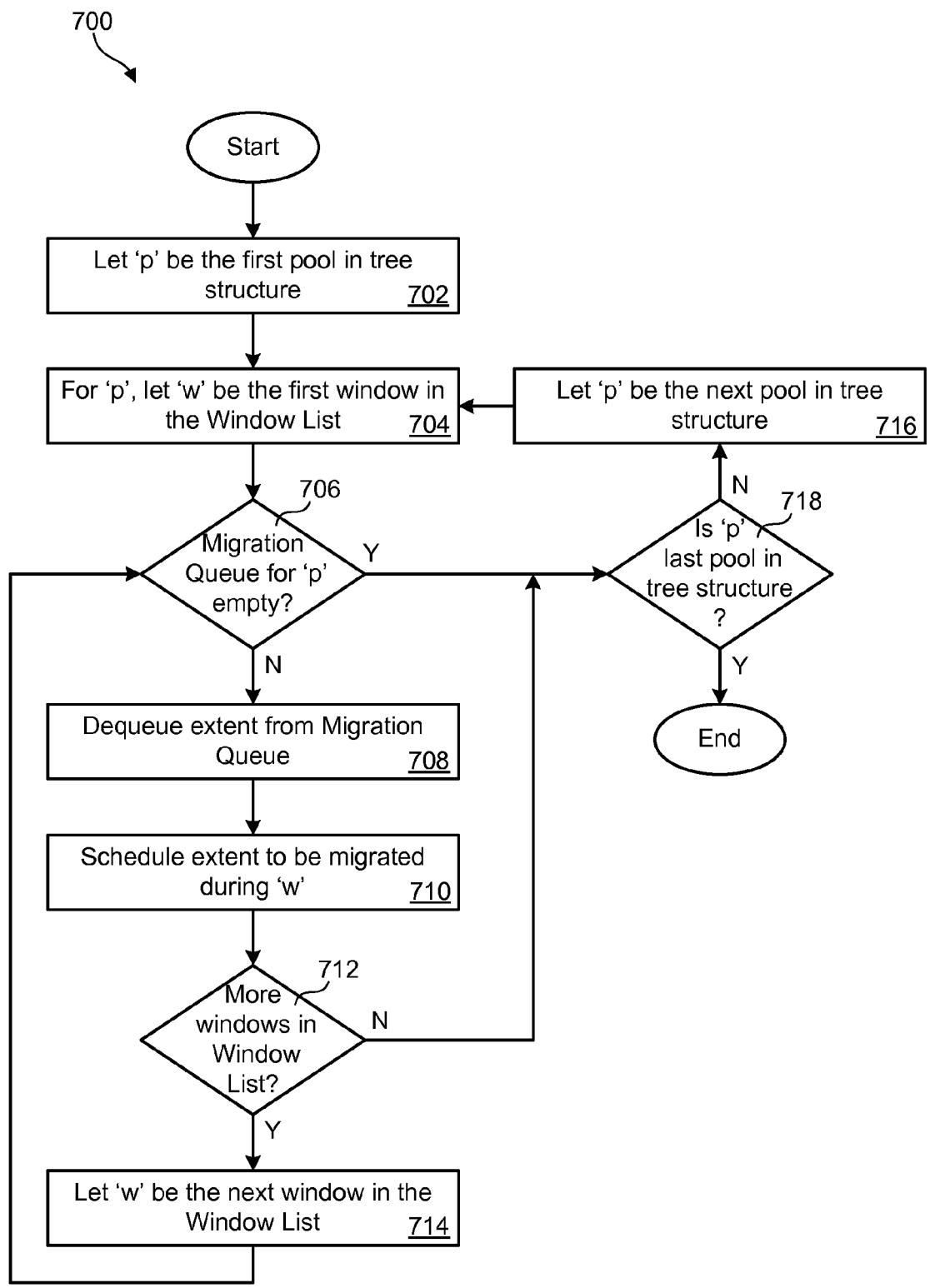
FIG. 7 is a flow diagram showing one embodiment of a method for scheduling extents for migration using the migration windows discovered in FIG. 6.

Referring to FIG. 7, one embodiment of a method 700 for scheduling extents for migration using the migration windows discovered by the method 600 of FIG. 6 is illustrated. This method 700 may be executed when the window discovery method 600 of FIG. 6 has completed. As shown, the method 700 initially lets 702 "p" be the first extent pool 302 in the hierarchical tree structure 300. For the extent pool "p", the method 700 lets 704 "w" be the first window (i.e., the most optimal window) in the window list 424. The method 700 then determines 706 whether the migration queue 416 for "p" is empty. As previously described, the migration queue 426 is a FIFO-prioritized queue that lists extents waiting to be migrated to the extent pool 302. Thus, extents that have been waiting for migration the longest will be scheduled first and assigned the most optimal migration windows.

If the migration queue 426 is not empty, the method 700 dequeues an extent from the migration queue (i.e., dequeues the extent that has been waiting for migration the longest) and schedules 710 the extent for migration during the migration window "w". The method 700 then determines 712 whether there are any more windows in the window list 424. If there are more windows, the method lets 714 "w" be the next window (i.e., the next most optimal window) in the window list 424. If more extents are listed in the migration queue 426, the method 700 will then assign the next extent in the migration queue 426 to the window "w". This process continues until there are no more extents in the migration queue 426 or there are no more windows in the window list 424. When either the migration queue 426 or the window list 424 is empty, the method 700 moves 716 to the next extent pool 302 in the tree structure 300 and repeats the steps previously described. When the last extent pool 302 in the tree structure 300 has been processed, the method 700 ends.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for scheduling the migration of extents between extent pools of a storage system, the method comprising:
    periodically profiling an extent pool to generate a historical data access profile of the extent pool over a selected time cycle;
    calculating, using the historical data access profile, a window list comprising a plurality of migration windows of varying durations over the time cycle, each migration window having a start time and end time, each migration window having a duration sufficient to migrate an extent to the extent pool between the start time and end time, wherein an amount of I/O that occurs to the extent pool between the start time and end time affects the duration;
    selecting an optimal migration window from the plurality of migration windows to migrate an extent to the extent pool;
    identifying an actual extent for migration to the extent pool; and
    scheduling the actual extent for migration to the extent pool during the optimal migration window.

2. The method of claim 1, wherein periodically profiling the extent pool comprises maintaining running averages of data access rates for the extent pool at various time intervals.

3. The method of claim 2, further comprising storing the historical data access profile in a profile table associated with the extent pool, the profile table storing the running averages for each time interval.

4. The method of claim 1, wherein the migration windows are adjacent in time.

5. The method of claim 1, further comprising ordering the migration windows in the window list from most optimal to least optimal.

6. The method of claim 1, further comprising periodically recalculating and updating the migration windows in the window list.

7. The method of claim 1, wherein identifying the actual extent comprises identifying the actual extent in a migration queue associated with the extent pool, the migration queue recording, on a FIFO basis, extents identified for migration to the extent pool.

8. The method of claim 1, wherein the extent pool is one of a plurality of extent pools organized into a hierarchical tree structure.

9. An apparatus for scheduling the migration of extents between extent pools of a storage system, the apparatus comprising:
    a profiling module to periodically profile an extent pool to generate a historical data access profile of the extent pool over a desired time cycle;
    a discovery module to calculate, using the historical data access profile, a window list comprising a plurality of migration windows of varying durations over the time cycle, each migration window having a start time and end time, each migration window having a duration sufficient to migrate an extent to the extent pool between the start time and end time, wherein an amount of I/O that occurs to the extent pool between the start time and end time affects the duration;
    the discovery module further configured to determine, from the plurality of migration windows, an optimal migration window for migrating an extent to the extent pool;
    a scheduling module to identify an actual extent for migration to the extent pool; and
    the scheduling module further configured to schedule the actual extent for migration to the extent pool during the optimal migration window.

10. The apparatus of claim 9, wherein the profiling module is configured to maintain running averages of data access rates for the extent pool at various time intervals.

11. The apparatus of claim 10, wherein the profiling module is further configured to store the historical data access profile in a profile table associated with the extent pool, the profile table storing the running averages for each time interval.

12. The apparatus of claim 9, wherein the migration windows are adjacent in time.

13. The apparatus of claim 9, wherein the discovery module is further configured to order the migration windows in the window list from most optimal to least optimal.

14. The apparatus of claim 9, wherein the discovery module is further configured to periodically recalculate and update the migration windows in the window list.

15. The apparatus of claim 9, wherein the scheduling module is further configured to identify the actual extent in a migration queue associated with the extent pool, the migration queue recording, on a FIFO basis, extents identified for migration to the extent pool.

16. The apparatus of claim 9, wherein the extent pool is one of a plurality of extent pools organized into a hierarchical tree structure.

17. A computer program product for scheduling the migration of extents between extent pools of a storage system, the computer program product comprising a non-transitory computer-readable storage medium having computer-usable program code embodied therein, the computer-usable program code comprising:
    computer-usable program code to periodically profile an extent pool to generate a historical data access profile of the extent pool over a selected time cycle;
    computer-usable program code to calculate, using the historical data access profile, a window list comprising a plurality of migration windows of varying durations over the time cycle, each migration window having a start time and end time, each migration window having a duration sufficient to migrate an extent to the extent pool between the start time and end time, wherein an amount of I/O that occurs to the extent pool between the start time and end time affects the duration;
    computer-usable program code to select an optimal migration window from the plurality of migration windows to migrate an extent to the extent pool;
    computer-usable program code to identify an actual extent for migration to the extent pool; and
    computer-usable program code to schedule the actual extent for migration to the extent pool during the optimal migration window.

18. The computer program product of claim 17, further comprising computer-usable program code to maintain running averages of data access rates for the extent pool at various time intervals.

19. The computer program product of claim 18, further comprising computer-usable program code to store the historical data access profile in a profile table associated with the extent pool, the profile table storing the running averages for each time interval.

20. The computer program product of claim 17, wherein the migration windows are adjacent in time.

21. The computer program product of claim 17, further comprising computer-usable program code to order migration windows in the window list from most optimal to least optimal.

22. The computer program product of claim 17, further comprising computer-usable program code to periodically recalculate and update the migration windows in the window list.

23. The computer program product of claim 17, further comprising computer-usable program code to identify the actual extent in a migration queue associated with the extent pool, the migration queue recording, on a FIFO basis, extents identified for migration to the extent pool.

24. The computer program product of claim 17, wherein the extent pool is one of a plurality of extent pools organized into a hierarchical tree structure.

* * * * *